(12) United States Patent
Sheridan

(10) Patent No.: US 6,284,346 B1
(45) Date of Patent: Sep. 4, 2001

(54) MACROCELLULAR CUSHION AND FOLDING ELASTOMER TRUSS

(76) Inventor: Timothy Brian Sheridan, 119 W. Mt. Airy Ave., Philadelphia, PA (US) 19119

(*) Notice: Subject to any disclaimer, the term of this patent is extended or adjusted under 35 U.S.C. 154(b) by 0 days.

(21) Appl. No.: 09/135,603

(22) Filed: Aug. 18, 1998

(51) Int. Cl.$^7$ ................................. B32B 3/00; B32B 1/00
(52) U.S. Cl. .......................... 428/156; 428/131; 428/136; 428/137; 428/155; 428/167; 428/172; 428/174; 428/178; 428/182; 428/188
(58) Field of Search ..................................... 428/178, 188, 428/314.2, 314.4, 131, 136, 137, 155, 167, 172, 174, 182, 156

(56) References Cited

U.S. PATENT DOCUMENTS

| | | | |
|---|---|---|---|
| 3,949,031 | * | 4/1976 | Fairbanks ........................... 428/314.2 |
| 4,267,792 | * | 5/1981 | Kimura et al. ........................ 114/219 |
| 4,753,841 | * | 6/1988 | Noel et al. ............................ 428/182 |
| 5,083,335 | * | 1/1992 | Krouskup et al. ........................ 5/464 |

* cited by examiner

Primary Examiner—Donald J. Loney
(74) Attorney, Agent, or Firm—Caesar, Rivise, Bernstein, Cohen & Pokotilow, Ltd.

(57) ABSTRACT

An improved closed-cell foam sheet stock and method for producing constant force characteristics in elastomer cushions. A closed cell foam is formed as a corrugated cardboard with regular cavities and support elements between two surface sheets. The resulting stock material possesses similar flexibility to foam stock but with an elongated force curve. A method for modifying this or other corrugated elastomers for efficient constant force curves is further provided where alternating support members are conjoined or buttressed to fold in controlled sigmoid shape under load. The resulting collapsible truss or space frame structure produces a cushion with improved cushioning, load distribution, shock absorption and resistance from lateral collapse while folding uniformly and efficiently to a smooth, compact and comfortable support under full compression. The orthopedic constant force profile allows uses in shoes, furniture, mattresses, sports padding, aircraft seats or packaging applications and extends the dynamic range of more resilient elastic, plastic or foam materials including very lightweight closed cell foam. For packaging applications both the collapsing truss or the less sophisticated corrugated profiles provide lighter weight and improved impact absorption over solid closed-cell foams.

5 Claims, 1 Drawing Sheet

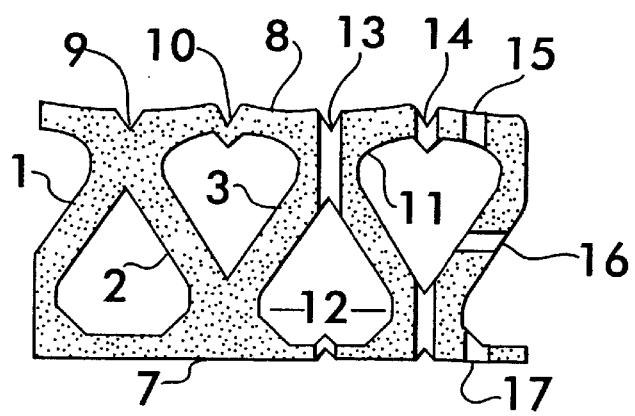
FIG.1
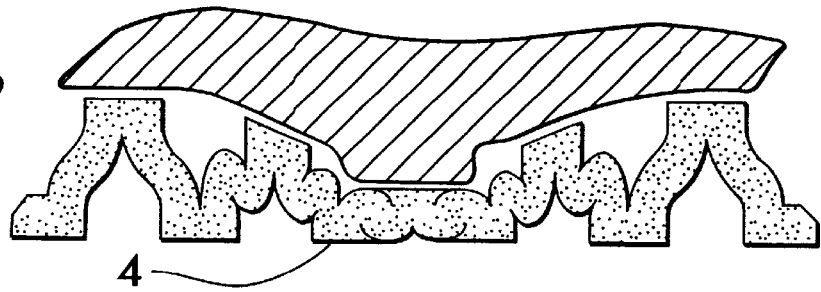
FIG.2
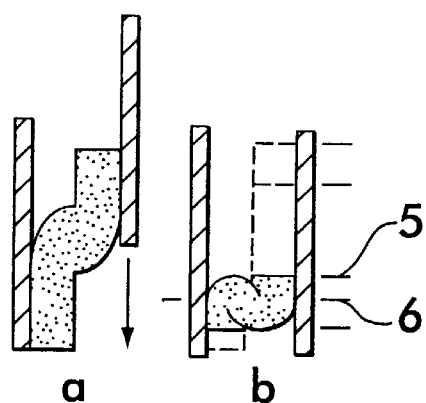
FIG.3
FIG.4
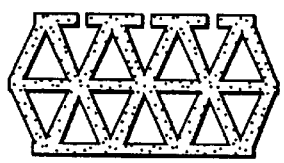 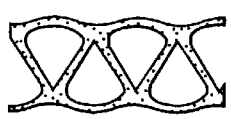 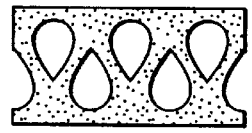 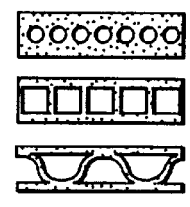
c　　　　d　　　　e
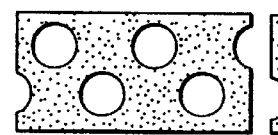 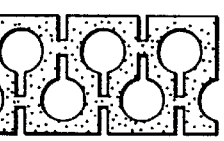 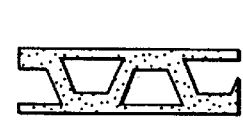 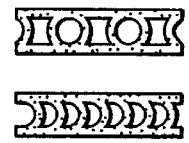
f　　　　g　　　　h　　　　i

MACROCELLULAR CUSHION AND FOLDING ELASTOMER TRUSS

| U.S. PATENT DOCUMENTS | | |
|---|---|---|
| 1,887,310 | 11/1932 | King |
| 2,194,364 | 3/1940 | Minor |
| 2,290,615 | 6/1942 | Firestone |
| 2,433,012 | 12/1947 | Malicovitz |
| 2,785,739 | 3/1957 | McGregor |
| 2,860,768 | 11/1958 | Smithers |
| 3,047,282 | 7/1962 | Hardy |
| 4,222,053 | 9/1980 | Brogan |
| 4,267,782 | 5/1981 | Sakuraoka |
| 4,756,266 | 7/1988 | Sakuraoka |
| 5,054,414 | 1/1992 | Yamaguchi |
| 5,083,335 | 1/1992 | Krouskop |
| 4,574,101 | 3/1986 | Tricca, et. al |
| 4,713,854 | 12/1987 | Graebe |

BACKGROUND OF INVENTION

The present invention relates to the production of a cushion or stock material with a predetermined internal structure to achieve desired compression properties from otherwise firmer but compressible or elastomeric material. The invention is best illustrated in the difficult application of an orthopedic cushion such as a mattress.

To support a body orthopedicly, it is generally accepted that a "constant force" cushion should produce a minimal constant support force over as large an area of the body as possible with a corresponding minimum of additional force applied to broadly heavier regions (or protrusions) and lesser forces on lighter regions.

These conditions should result in a minimum of force applied where body regions are minimally sheered by differing amounts of support force and where necessary support force is applied to body concavities. The ideal cushion should achieve this without sagging over time or under excess weight and thus provide body alignment and a defined stop zone for the constant force motion.

Constant force cushions are, however, somewhat difficult to achieve in practice because common springs or foams produce increasing force with compression; and, even bladder structures such as air or water beds typically have surface effects from the bladder itself, rather than constant pressure within, which shift forces toward body protrusions and away from body concavities. Inflexibility or inelasticity of support surface layers can also prevent support forces from filly reaching body concavities such as the lower back. And, finally, mattress type constructions can suffer from "sag" over time or if improperly weighted or inflated.

In beds and other elastomer cushions, attempts to alter material properties have centered principally on foams, their microcell properties and elasticity with even the best foams having only slightly elongated force curves and generally heavier (hence more costly) formulations.

Various bed and cushion applications have employed cavities in foam or rubber materials but these generally suffer from increasing force curves, insufficient support efficiency, unevenness of support or difficult fabrication requirements. Such cavity modification has also not been applied to generalized plank stock for multiple use such as in packaging materials with lighter and more efficient closed cell foams.

There is, therefore, a need for a light weight cushion material with controlled range of force and motion and one which may obtain varied force properties along it's length to accommodate heterogeneously weighted bodies and comes "ready to use".

It is the object of this invention to provide such a cushion or stock material which may obtain a range of short, elongated or constant force curves, limited surface effects and a controlled range of motion and forces along it's length. It is a further object of this invention to produce a cushion material of lighter weight, orthopedic quality including both support and ventability and one which requires minimal assembly or cutting after initial production. It is also an object of this invention to provide a structure for producing flatter constant force curves which can be formed from any number of foams, elastomers, plastics or spring steel and, in particular, very lightweight and water proof closed-cell foam. Finally it is an object of this invention to introduce a general extruded closed-cell-foam cardboard stock material and several general uses for such.

SUMMERY OF INVENTION

To meet constant force cushioning requirements the present invention employs a truss like cross section. Members of the truss form a plurality of improved a-spring units where the tops and bottoms of the members are symmetrically elongated and co-joined or raised and buttressed.

These features improve upon Sakuraoka [4,267,792, 4,756,2661 and Yamaguchi [5,054,414] by reducing the effective buckling length of support members, preventing the unnecessary outward (lateral) buckling of support members, insuring relatively high initial support and allowing force consistency during collapse. The result is an efficient load distributing system and a cushion of more "constant force" quality with similarly improved shock absorption properties.

Raising the ends of support elements also produces extended folding of the spring elements through the compression cycle into complete thirds or a full sigmoid (up down up) or (down up down) pattern. This extended folding improves the range of motion and potential support element density over non-sigmoid folding such as in King [1,887,310] and Zalicovitz [2,433,012].

The support elements may also be shortened or placed closer together to minimize the "bottoming out" effect when compression extends beyond the generally constant force range. The bottoming out effect also eliminates potential "mattress sag" and thus provides a plane of body alignment in mattress like applications.

The controlled sigmoidal folding process improves over prior art such as King [1,887,310], Minor [2,194,364], Firestone [2,290,615], Hardy [3,047,282] and Krouskop [5,083,335] allowing support elements to collapse with improved mechanical efficiency while folding compactly and uniformly to form a more comfortable support surface under full compression.

The support units may also be constructed without a surface layer (FIG. 2) in which case the resulting cushion bares topographical similarity to Smithers [2,860,768] but where the material is uniquely pre-stretched along one lateral dimension and accordingly shaped to produce controlled "sigmoid" folding rather than simple uncontrolled buckling as in King [1,887,310], Firestone [2,290,615], Smithers (2,860,768] and Krouskop [5,083,335].

It should be clear that any number of elastomers or flexible materials can accomidate the described folding or collapsing truss cushion structure. For orthopedic uses such as a light weight, low cost, portable or water proof mattresses, seat cushions or aircraft seats a resilient, springy, low-set, low-creep closed-cell foam will produce the best performance per weight. A similarly low-set open or semi-open-cell foam will produce generally lesser forces for a given base material but firmer plastics, rubber or rubber-like materials are also possible. For shoes or high force applications a stiff solid elastomer may be more applicable. Choice of materials may be performed empirically or calculated through standard engineering means.

In non-constant force applications, such as a general packaging or plank stock material, a traditional closed cell foam may be too firm as cushioning material. The present invention also applies to the use of more generalized corrugated form to improve the cushioning ability in a planer closed cell foam stock by increasing compressibility through a series of cavities along an extruded axis. In non-constant force applications any regular series of cavities or support elements will suffice to create a class of corrugated closed cell stock. These may be classed as either compressing, collapsing or mixed profiles. Compressing profiles have members which do not significantly fold and produce delayed force curves while collapsing profiles produce flatter curves and can produce efficient collapse to a compact shape with little or no cavity space remaining and constant force application in the preferred embodiment below.

Use of foam in this application produces a stiff but flexible light weight stock material unique within closed cell foams with greater thickness and compressibility and requiring no additional lamination, hole punching or other processing after production.

Thus a derivative aspect of this invention is an extruded corrugated closed cell foam panel for general use where the panel has one or more layers of any regular linear array of cavity and support pattern between two surface support faces. The closed cell allows the gas within in foam cells to be a primary compression element rather than the inter molecular forces common in fibrous or plastic cardboards or the flexible elastomer in an open cell foam. Thus the closed-cell cardboard operates according to a different principle than the prior art in cardboards. The resulting hybrid is a combination of closed cell and larger macro-cell structure. The larger "macro-cell" structure is the alterable truss or cavity pattern which may be configured to refine the desired material properties.

BRIEF DESCRIPTION OF THE DRAWINGS

FIG. 1 is a cross sectional view of a folding truss cushion with recesses for air flow and surface elasticity and an upturned prestressed support surface for support distribution.

FIG. 2 shows an irregular body resting on a folding truss cushion cross section without surface layers and bottoming out in the center. (the supported body is shown slightly separated from the cushion for clarity).

FIG. 3 demonstrates a single sigmoid support element between two ridged sliding planes to illustrate an empirical method of finding the correct support member proportions and spacing.

FIG. 4 shows several cross section variations on the folding truss pad (c, d, e, f, g, h) and a set of general compressing and collapsing corrugated forms (i).

DESCRIPTION OF PREFERRED EMBODYMENT

This preferred embodiment entails a roughly plainer lightweight resilient closed cell foam with an extruded truss type cross section (FIG. 1). Cushioning is achieved through a series of support elements (1, 2, 3) which provide efficient structural support but which collapse with decreasing structural efficiency.

Body regions requiring excess force are supported as the cushion "bottoms out" (4) or alternatively by preventing bottoming out with sufficient support force and depth using sufficiently thick support elements and sufficient number and scale of cushion layers. Body regions requiring "Lesser force" are supported as the body simply rests on the surface. Additional traditional padding may be added to the support surface to adjust initial surface support, comfort and moisture properties.

The support members are joined for a length at their ends (from 5 to 6) or may be considered to be shorter but raised on a platform (7) each having the effect of buttressing the folding support element along the potential outward buckling area (from 5 to 6), allowing it to fold correctly and to achieve significant range and compactness under full collapse.

To reduce forces within the connecting surface (8) are notches (9 and 10) to allow greater expansion, contraction and deflection of the surface layer as it conforms to a body shape. Additional channels, ridges and or voids may be added throughout the surface to decrease surface tension effects or permit folding of the cushion structure Added material at (11) and notches between elements (9) help spread the support forces outward from the support members. More uniform support is also obtained by pre-stressing the surface layer (8) curving it upward to a shape complimentary to that of deformation under compression forces thereby deflecting under support forces into more uniform support pressure along their length. Firmer material in surface elements or attached to bridge between support elements will also distribute forces between support elements as will added layers of standard cushioning material or a reduction in scale of the truss structure thus increasing the frequency of support members.

To achieve gradual bottoming out the members (1, 2, 3) can be widened such that they fold to a width larger the lateral folding zone (12) or the folding zone (12) may be reduced with dimensions depending on the elasticity and compressibility of the material as it folds. With thin members bottoming out may also be controlled by shortening the raised support members to a length which insufficient for full folding after initial collapse.

To achieve a smooth surface under full compression care is taken to assure the members fold to uniform height. Remaining spaces under full collapse can be filled to prevent slight depressions in the surface and areas of collision can be removed to prevent lumps. Compact folding assures maximum available volumetric decrease for the given ratio of material to cavity and therefore improved range of motion within the selected force dynamic. Higher forces generally require a lower ratio of material to cavity space.

Greater support is obtained by shortening or widening support members (1, 2, 3) and lesser support is obtained by thinning or spreading out members.

If formed without surface layers as in (FIG. 2) the corrugated sheet material can be folded along an extrusion axis but retains similar constant force properties under surface forces (FIG. 2). Scoring or channels along the material will allow folding in a second axis to cover complex surfaces and reduce surface tension forces.

And finally, any grooves, ridges, channels or voids in the surface layer or holes (13, 14, 15, 16) throughout the material will also allow greater air and moisture flow to and from a supported body as will added layers of many common cushion or bedding materials. Note that hole (16) will fold into proper alignment with (15) and it's lower extenuation (17) as the cushion is compressed thus insuring no occlusion under load.

The present invention extends the useful range of many elastomeric materials and enables optimized force curves meeting or exceeding that of an orthopedic air mattress in support and function. It should be clear to those skilled in the necessary arts that this invention may be formed through common extrusion, pressing, rolling, molding or lamination processes at various scales and proportion for all manner of support or impact absorption with or without a connecting surface layer (8), laminants or integrally formed components or even as a simple light weight panel which can be easily cut, scored or folded into other constructions. The preferred embodiment is, therefore, not intended to limit the scope of the cellular cardboard, the collapsing truss structure composed in any flexible material or the spirit of the appended claims.

What is claimed is:

1. A lightweight cushion comprising:

a top layer, a bottom layer, and a plurality of intermediate support members;

said top layer including an outer surface comprising a plurality of cavities spaced transversely thereon;

said intermediate support members forming a truss-like structure angularly positioned between said top and bottom layers; and, said bottom layer, including an outer surface comprising a plurality of cavities spaced transversely thereon.

2. The cushion of claim 1, wherein said cavities are selected from the group consisting of holes, notches, cuts, perforations, voids, ridges and grooves.

3. The cushion of claim 1, wherein said top layer, said bottom layer, and said intermediate support members are selected from the group consisting of foams, elastomers, plastics, and spring steel.

4. The cushion of claim 1, wherein said intermediate support members are adapted to be symmetrically elongated and co-joined.

5. A lightweight cushion comprising a plurality of support members adapted to form a truss-like structure, said support members include pre-stressed curvatures along their axis, said pre-stressed curvatures form inward and outward channels, thereby providing respective foot sections adjacent to said support members.

* * * * *